United States Patent [19]
Simkowski et al.

[11] Patent Number: 5,630,679
[45] Date of Patent: May 20, 1997

[54] HEIGHT ADJUSTABLE CONVEYOR SYSTEM

[75] Inventors: Donald J. Simkowski, Loveland; Thomas M. Ingraham, Fort Collins, both of Colo.

[73] Assignee: Goldco Industries, Inc., Loveland, Colo.

[21] Appl. No.: 603,682

[22] Filed: Feb. 20, 1996

Related U.S. Application Data

[63] Continuation of Ser. No. 248,487, May 24, 1994, abandoned.

[51] Int. Cl.$^6$ ................................................. B65G 51/02
[52] U.S. Cl. ............................ 406/86; 406/88; 406/196
[58] Field of Search ............................ 198/586, 736.6, 198/861.2; 406/86, 87, 88, 108, 109, 113, 115, 154, 164, 165, 166, 191, 196

[56] References Cited

U.S. PATENT DOCUMENTS

| | | | |
|---|---|---|---|
| 2,812,613 | 11/1957 | Schütz | 406/196 X |
| 3,226,165 | 12/1965 | Merrick | 406/196 X |
| 3,343,650 | 9/1967 | Brown | 198/861.2 |
| 3,684,080 | 8/1972 | Van Nest | 198/861.2 X |
| 4,284,370 | 8/1981 | Danler et al. | 406/86 |
| 4,822,214 | 4/1989 | Aidlin et al. | 406/88 X |
| 4,955,464 | 9/1990 | Burger et al. | 198/586 X |
| 5,100,265 | 3/1992 | Mirkin | 406/86 |

Primary Examiner—Andrew C. Pike
Attorney, Agent, or Firm—Robert E. Harris

[57] ABSTRACT

A height adjustable conveyor system conveys articles between different heights as needed. The conveyor system includes guides that support the neck rings of articles to be conveyed, and the guides are mounted on an air conveyor having multiple sections so that the guides are caused to be flexed by different movements of the air conveyor sections. The air conveyor has pivotably coupled first, second, and third sections with the first section being vertically adjustable with respect to the third section and the second section being between and tiltable with respect to the first and third sections to thereby flex the guides as necessary to readily effect article height variations as needed between the input and the output of the system. Relative movement between the three sections of the air conveyor is effected by a lever pivotably connected with a fixed support and the first section of the air conveyor with the lever being actuated by a crank.

14 Claims, 5 Drawing Sheets

Fig_1

Fig_2

Fig_4

HEIGHT ADJUSTABLE CONVEYOR SYSTEM

This application is a continuation of application Ser. No. 08/248,487 filed May 24, 1994, now abandoned.

FIELD OF THE INVENTION

This invention relates to an article conveyor system, and, more particularly, relates to a height adjustable, air-urged article conveyor system.

BACKGROUND OF THE INVENTION

Conveyor systems are well known for use in conveying articles, such as containers or bottles, between different locations. Air-urged article conveyor systems are likewise well known for article conveying, as are systems that include guides for supporting articles by the neck ring of the articles and utilize air to urge the thus supported articles downstream in single file (see, for example U.S. Pat. No. 4,284,370).

When conveying articles between different locations, it has also often been found necessary to change the height of the article support at the output of the conveyor relative to the height of the article support at the input of the conveyor to accommodate infeed and discharge units of different heights (such as conveyor belts or the like). While height differences have heretofore been achieved between the opposite ends of a conveyor, complicated and/or expensive additional equipment has ordinarily been required.

For article conveyor systems that include air conveyors having guides for supporting articles by the neck rings, for example, changes in height of the supporting guides has heretofore normally required extensive and time consuming modification, or even virtual rebuilding, of the system each time adjustment of height was required. One attempt to accomplish height adjustment as a part of a conveyor system having an air conveyor and guides for supporting the neck rings of articles to be conveyed along the air conveyor is shown in U.S. Pat. No. 5,100,265, but this system requires providing a series of conveyor sections and rotation of the conveyor sections each time a new section is needed.

SUMMARY OF THE INVENTION

This invention provides an improved height adjustable conveyor system for conveying articles between different heights as needed. The conveyor system is simple but yet allows ready adjustment in article support height, and, preferably, allows ready adjustment in the height of guides supporting the neck rings of articles to be air conveyed.

Guides of the conveyor system used to support the neck rings of articles to be conveyed are flexed to readily enable different heights to be realized at one end of the system relative to the other end of the system. With the guides positioned on a multiple section air conveyor the sections of which are pivotably coupled to one another, flexing of the guides is controlled by different movements of the air conveyor sections, and relative movement between the air conveyor sections is controlled by a lever arrangement causing the relative movement between the different air conveyor sections.

With the guides supported by a three-section air conveyor the sections of which are relatively movable with respect to one another, flexing of the guides is preferably effected by causing the opposite end sections of the air conveyor to be heightwise adjusted relative to one another and the middle section to be tilted with respect to the opposite end sections.

It is therefore an object of this invention to provide an improved article conveyor system.

It is another object of this invention to provide an improved article conveyor system that includes flexible guides for conveying articles by the neck rings of the articles.

It is still another object of this invention to provide an article conveyor system that includes an air conveyor and guides for conveying articles such as bottles by the neck rings of the articles with the guides being flexed to readily achieve needed heightwise adjustments.

It is still another object of this invention to provide an article conveyor system that includes an air conveyor having multiple sections and guides connected with the multiple sections of the air conveyor so that the guides are caused to be flexed by relative movement between the sections of the air conveyor.

It is yet another object of this invention to provide an article conveyor system that includes an air conveyor having multiple sections and guides connected with the multiple sections of the air conveyor for conveying articles such as bottles with the guides being flexed by relative movement between the sections of the air conveyor to thereby effect height adjustment of articles conveyed by the conveyor system.

It is yet another object of this invention to provide an article conveyor system having flexible guides for supporting articles by the neck rings of the articles and pivotably coupled multiple air conveying sections connected with the guides with the air conveyor sections being relatively movable with respect to one another under the control of a lever arrangement for heightwise displacing and tilting different ones of the multiple air conveyor sections relative to one another to thereby readily achieve height adjustment in conveyance of articles between the input and output ends of the system.

With these and other objects in view, which will become apparent to one skilled in the art as the description proceeds, this invention resides in the novel construction, combination, and arrangement of parts as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE DRAWINGS

Figure 1:
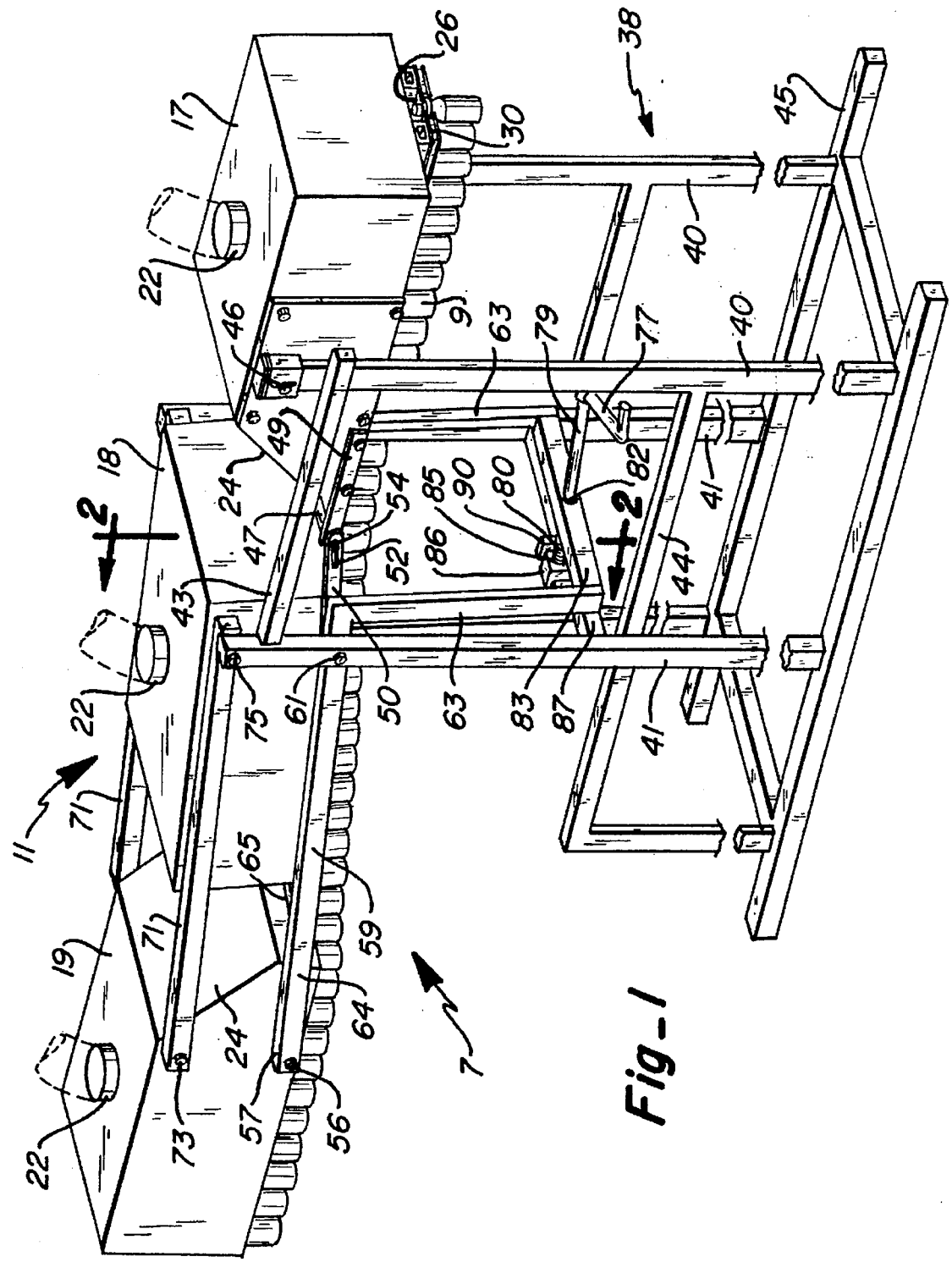
FIG. 1 is a perspective view of the system of this invention.
Figure 2:
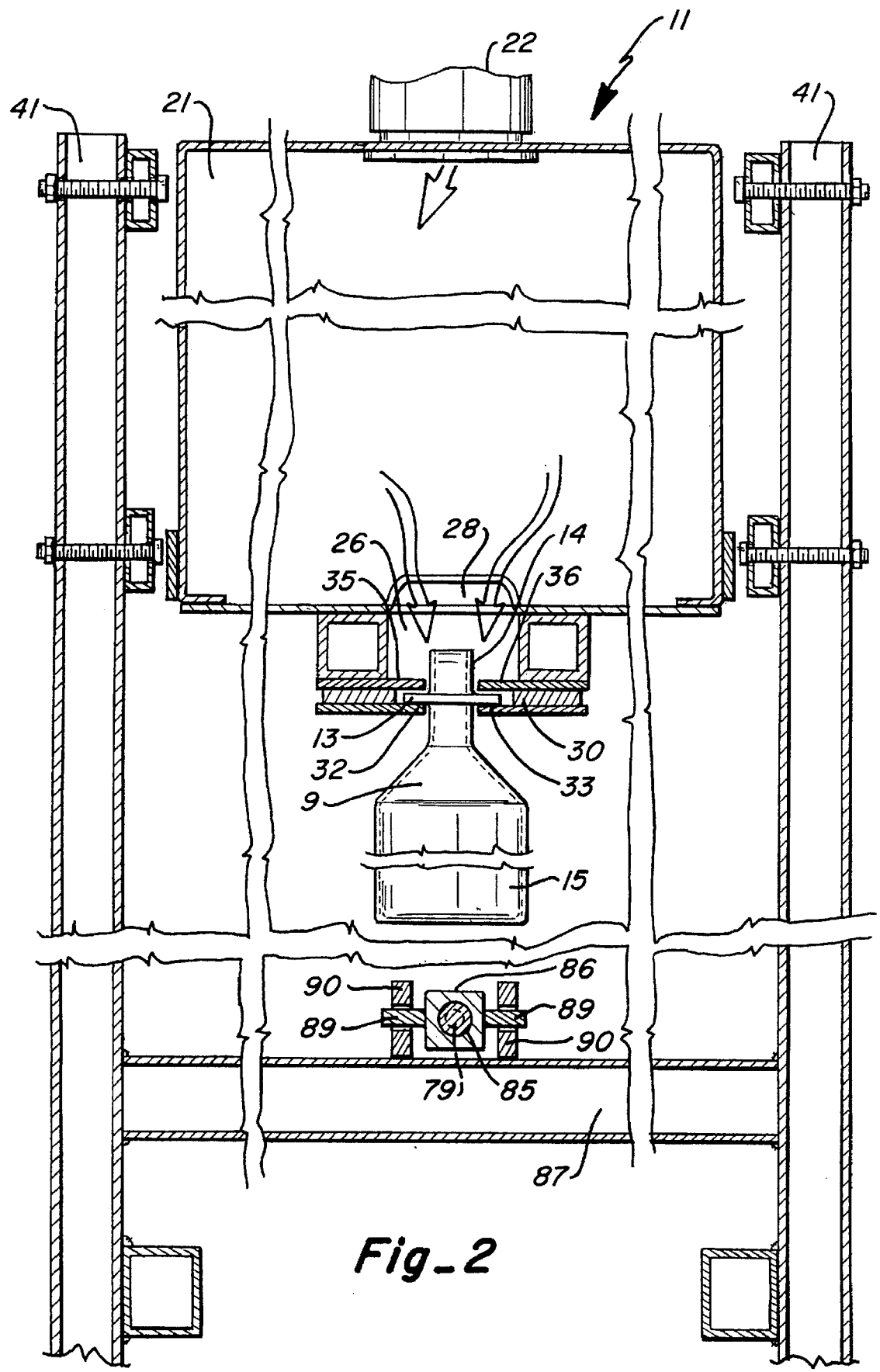
FIG. 2 is a partial sectional view taken through lines 2—2 of FIG. 1.
Figure 3:
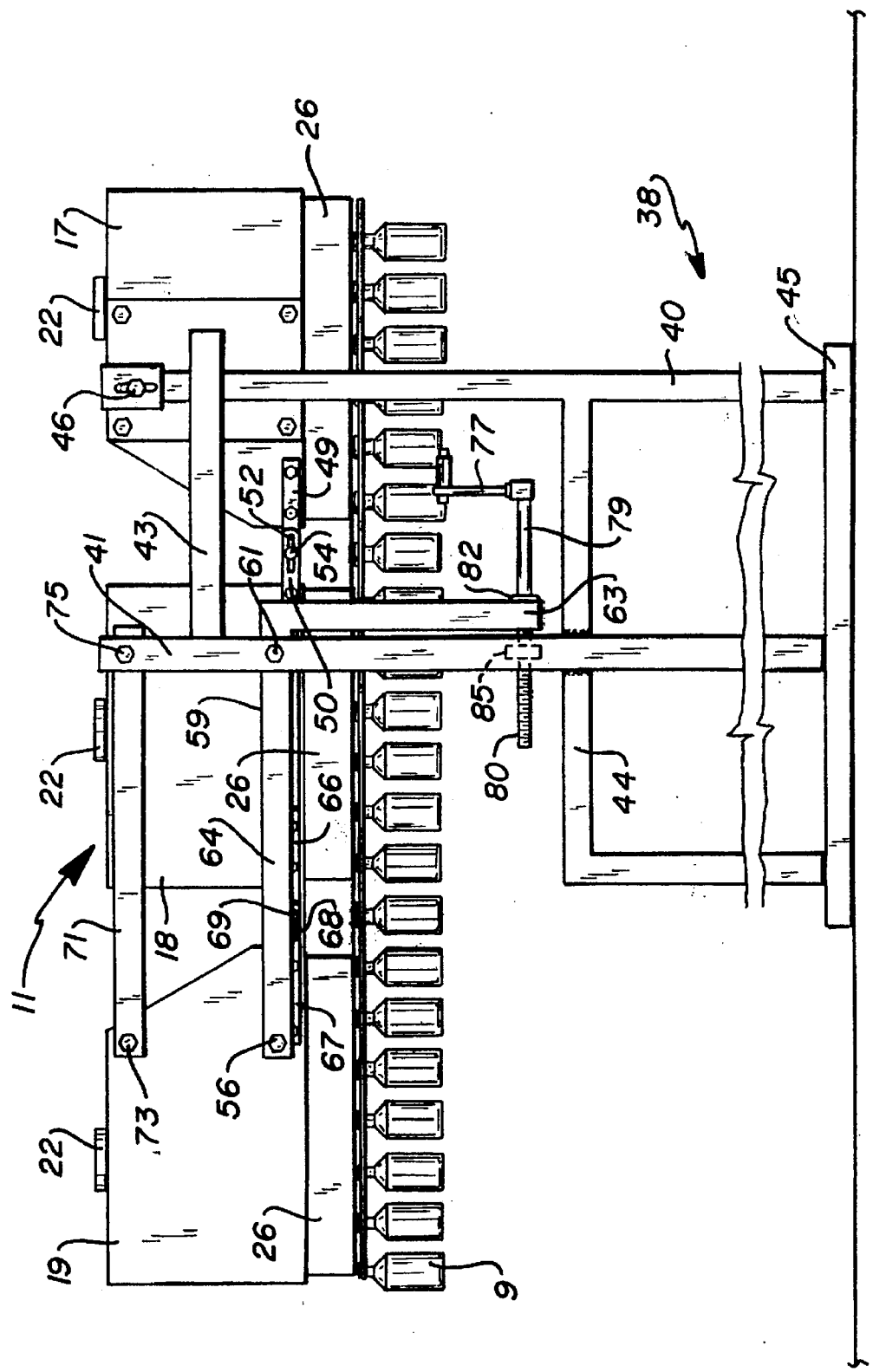
FIG. 3 is a side view of the system of this invention as shown in FIG. 1 but illustrating the system without height adjustment.

The article conveyor system 7 of this invention readily effects height adjustment between the input and output ends of the system so that articles 9 may be received at one height and discharged at a different height after passing through the system, as is best indicated by the perspective view of FIG. 1. As best shown in FIG. 2, conveyor system 7 preferably includes an air conveyor 11 of the type intended for conveying articles 9 such as bottles having a neck ring 13, a top neck portion 14 at and above the neck ring, and a lower body portion 15 below the neck ring.

As best shown in FIGS. 1, 3, 4, and 5, air conveyor 11 has a first section 17 (shown as the input end, or portion), a second section 18 (shown as the middle portion), and a third section 19 (shown as the output end, or portion). Each of the three sections of air conveyor 11 includes an upper air plenum 21 receiving air through duct 22. As shown, end 24 of first and third sections 17 and 19 of air conveyor 11, adjacent at opposite sides to middle section 18 of the air conveyor, is slanted to accommodate relative movement between the sections as brought out hereafter.

Sections 17, 18, and 19 of air conveyor 11 include an air chamber 26 for receiving the top neck portions of articles to be air conveyed, and, as best shown for middle section 18 in FIG. 2 (the other sections are identical), apertures 28 are provided in the top of air chamber 26 and air is introduced from plenum 21 into air chamber 26 through apertures 28 with the apertures being slanted to direct the air toward the top neck portions of articles then to be air conveyed to urge movement of articles through the conveyor along guides 30 (as is shown, for example, in U.S. Pat. No. 4,284,370).

As best indicated in FIGS. 1 and 2, flexible guides 30 are positioned below, and are connected with, all three sections of air conveyor 11 so that the guides extend entirely through the system and establish a path for conveyance of articles through the system. Guides 30 must be substantially rigid in order to convey articles through the system as intended, but guides 30 must also have the ability to be flexed in a generally vertical plane by the sections of the air conveyor during height adjustment, and, guides 30 may, for example, be constructed of thin sheets of steel to meet these ends.

As best indicated in FIG. 2, guides 30 preferably include lower horizontally spaced guide rails, or sheets, 32 and 33 and upper horizontally spaced guide rails, or sheets, 35 and 36, with guide rails 32 and 35 being vertically spaced from one another as are guide rails 33 and 36. Guide rails 32 and 35, as well as guide rails 33 and 36, are therefore spaced normally with respect to the direction of spacing between guide rails 32 and 33 and guide rails 35 and 36. Guide rails 32 and 33 are horizontally spaced from one another a distance just sufficient to allow the necks of articles to pass therebetween with guide rails 32 and 33 supporting the neck rings of the articles, guide rails 35 and 36 are horizontally spaced from one another a distance just sufficient to allow the necks of articles to pass therebetween with the neck rings of the articles just below guide rails 35 and 36, and guide rails 32 and 35, as well as guide rails 33 and 36, are vertically spaced from one another a distance just sufficient to allow the neck rings of the articles to be received therebetween so that the necks of the articles to be conveyed can slide between guide rails 32 and 33, as well as between guide rails 35 and 36, and the neck rings of the articles can slide between guide rails 32 and 35, as well as between guide rails 33 and 36, as the articles are conveyed through the system along the path established by guides 30.

As indicated in FIGS. 1 and 3 through 5, first section 17 of air conveyor 11 is mounted on housing, or fixed support, 38. As best indicated in FIG. 1, fixed support 38 includes first and second pairs of vertically extending beams 40 and 41 with beams 40 being positioned at opposite sides of first section 17 of air conveyor 11 and beams 41 being positioned at opposite sides of middle section 18 of air conveyor 11. As shown, beams 40 and 41 have cross-braces 43 and 44 extending therebetween and beams 40 and 41 are mounted on base support 45. As also shown, first section 17 is fastened to beam 40 by means of fastener 46 (shown as a nut and bolt), and, if desired, first section 17 may be vertically adjusted with respect to beam 40 to accommodate the height needed for conveying articles between the system and an adjacent conveyor or the like. Middle section 18, however, while being adjacent to beams 41, is not mounted on beams 41.

Middle section 18 of air conveyor 11 is pivotably coupled to first section 17 by means of pivot rod 47 the opposite ends of which extend through apertures at the free ends of arms 49 and 50 extending from the opposite lower sides of first and middle sections 17 and 18 of the air conveyor. One aperture at the free ends of arms 49 and 50 includes a notch 52 to allow limited horizontal movement between first and second sections 17 and 18 during height adjustment achieved through relative movement between the sections of air conveyor 11. As also shown, pivot rod 47 has retaining nuts 54 at opposite ends.

The lower portion of third section 19 of air conveyor 11 is pivotably mounted by means of pivot pins 56 on one end 57 of a pair of L-shaped beams 59 spaced apart a sufficient distance to enable third section 19 (as well as middle section 18) to be received therebetween. Pivot pins 61 extend through beams 59 (near the junction of arms 63 and 64 of each L-shaped beam 59) and through beams 41 (of fixed support 38) so that L-shaped beams 59 provide a lever arrangement with beams 59 pivoting about the fixed support at pivot pins 61.

Third section 19 of air conveyor 11 is also pivotably coupled to middle section 18 by means of pivot rod 65 the opposite ends of which extend through apertures at the free ends of arms 66 and 67 extending from the opposite lower sides of middle and third sections 18 and 19 of the air conveyor. One aperture at the free ends of arms 66 and 67 includes a notch 68 to allow limited horizontal movement between middle and output sections 18 and 19 during height adjustment achieved through relative movement between the sections of air conveyor 11. As also shown, pivot rod 65 has retaining nuts 69 on opposite ends.

Additional arms, or rods, 71 are pivotably mounted at each side of third section 19 with one end of each rod being pivotably mounted at the upper portion of the opposite sides of third section 19 by pivot pins 73. The other end of each arm 71 is pivotably mounted by means of pivot pins 75 to beam 41 of fixed support 38 above the pivotable mounting of L-shaped beam 59 to beam 41 so that arms 71 are substantially parallel to arms 64 of L-shaped beams 59.

Actuation of the lever arrangement provided by L-shaped beams 59 is effected by means of crank 77 having a shaft 79 with a worm gear configuration 80 on the end portion thereof. Shaft 79 is journalled for rotation in aperture 82 of arm 83 extending between the free ends of arms 63 of L-shaped beams 59, and the end portion of shaft 79 (having worm gear configuration 80 thereon) is received as shown in FIG. 2, in aperture 85 (having a worm gear configuration compatible with that of worm gear configuration 80) of block 86 mounted on arm 87 (extending between beams 41 of fixed support 38) by means of rods 89 extending into apertures in flanges 90 (mounted on arm 87) so that as the crank is rotated in one direction the spacing between the free ends of arms 63 and beams 41 is increased (to thus lower third section 19 relative to first section 17), and as the crank is rotated in the opposite direction the spacing between the free ends of arms 63 and beams 41 is decreased (to thus raise third section 19 relative to first section 17). The range of height adjustment of the guides is limited by the amount of flexing of the guides that can be achieved by the lever arrangement without appreciable adverse effects on movement of articles through the system, which is, at present, a maximum tilt or angular displacement of the guides within a range from zero degrees to about 20 degrees from horizontal at the midsection of the guides.

To lower third section 19 of air conveyor 11 relative to first section 17, crank 77 is rotated in the direction to increase the spacing between the free ends of arms 63 and beams 41 of fixed support 38. As L-shaped beams 59 pivot about pivot pins 61, the free ends of arms 64 (pivoting about pivot pins 56) are moved downwardly (in like manner, the ends of arms 71 pivot about pivot pins 73 and also are moved downwardly) to move third section 19 downwardly with third section 19 remaining substantially free of tilt, or rotation, due to pivoting of third section 19 about pivot rod 65 in conjunction with pivoting of third section 19 about pivot pins 56 and 73. The downward movement of third section 19 causes middle section 18 to be tilted, or rotated, since middle section 18 is pivotably mounted between first and third sections 17 and 19 by means of pivot rods 47 and 65.

Figure 4:
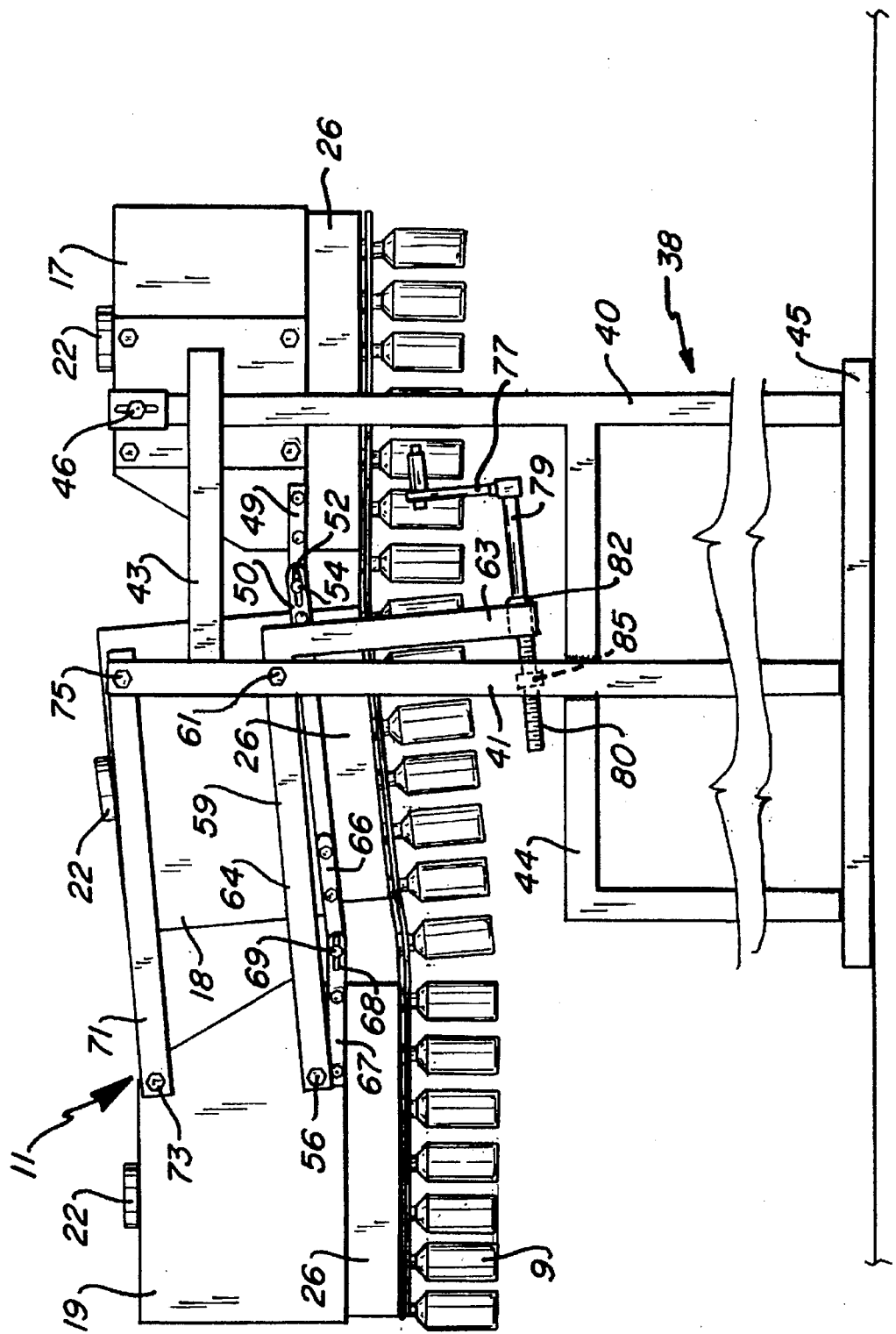
FIG. 4 is a side view similar to that of FIG. 3 but illustrating the system with medium height adjustment.

The downward movement of third section 19 and the tilting movement of middle section 18 causes flexing of guides 30 connected with all of the conveyor sections with the flexing between sections of the air conveyor being substantially uniform and providing a descending height adjustment to be readily made from the first section 17 to the third section 19, as shown in FIG. 4.

Figure 5:
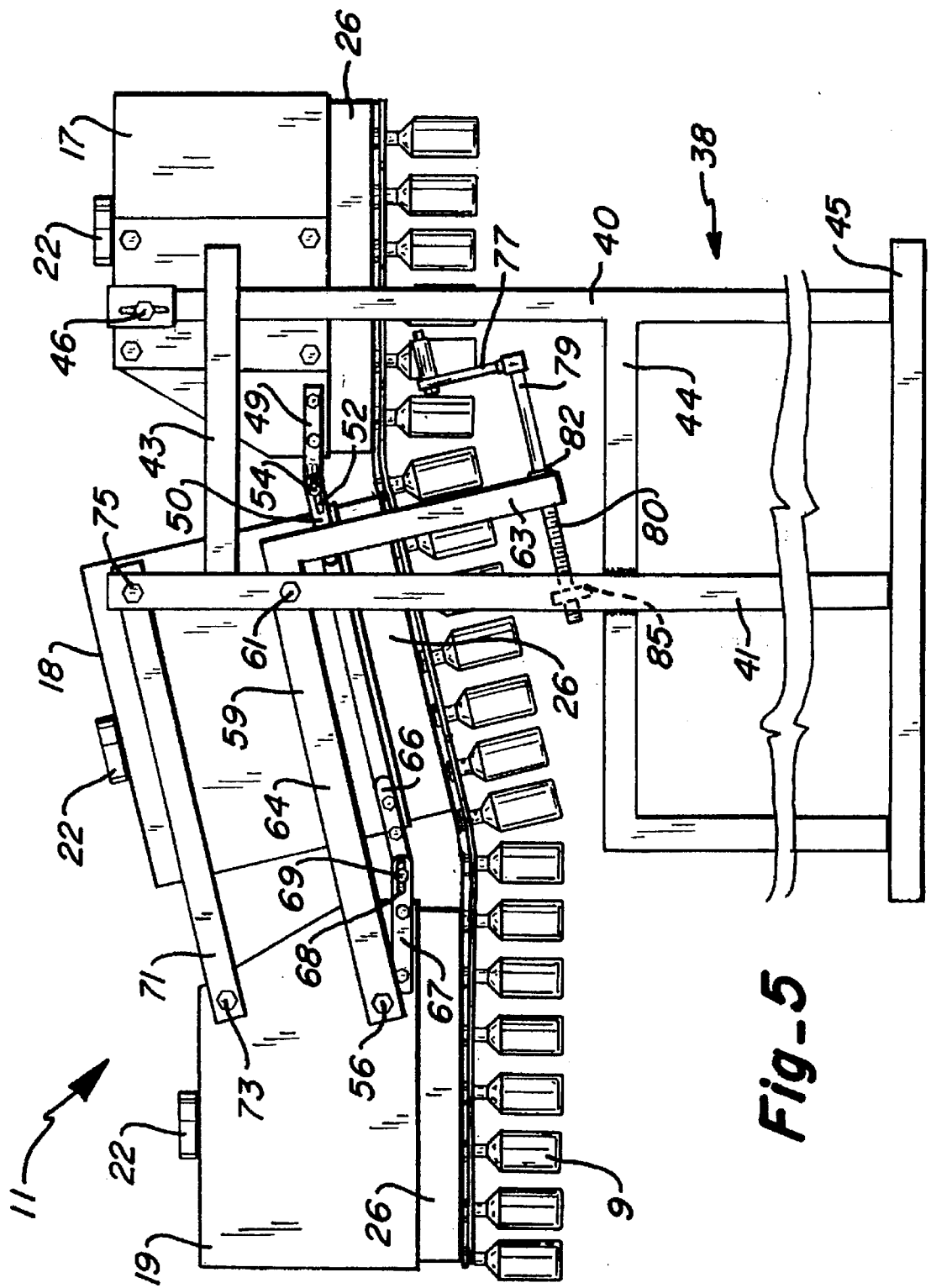
FIG. 5 is a side view similar to that of FIGS. 3 and 4 but illustrating the system with greater height adjustment than that provided as shown in FIG. 4.

As indicated in FIG. 5, a further increase in the spacing between the free ends of arms 63 of L-shaped beams 59 and beams 41 of fixed support 38 causes a further displacement of third section 19 in the downward direction and increased tilting of middle section 18 to cause a greater height adjustment due to greater flexing of guides 30.

It is to be appreciated from the foregoing that the height adjustment provided by this invention is infinite over the full range of adjustment afforded by the device in that any height adjustment within the range can be achieved by actuation of the L-shaped lever 59 relative to the fixed support.

It is also to be appreciated that the system of this invention can be specifically used to adjust the height of an output section relative to that of an input section by connecting and/or utilizing section 17 as the input section and connecting and/or utilizing section 19 as the output section. In like manner, the system of this invention can also be specifically used to adjust the height of an input section relative to that of an output section by connecting section 17 as the output section and connecting section 19 as the input section.

From the foregoing, it is also to be appreciated that this invention provides an improved system for readily achieving height adjustment, particularly in a system that includes an air conveyor having guides for engaging the neck rings of articles to be air conveyed.

What is claimed is:

1. A height adjustable conveyor system for conveying articles, said system comprising:

guide means having input, middle, and output portions, said guide means being flexible and establishing a path along which the articles are conveyed between said input and output portions;

an air conveyor adjacent to said guide means, said air conveyor having apertures through which air from said air conveyor urges the articles along said path established by said guide means, and said air conveyor having adjacent input, middle, and output portions each having an end wall spaced from an opposing said end wall of the air conveyor portion adjacent thereto, said air conveyor having said input, middle, and output portions connected with said input, middle, and output portions, respectively, of said guide means with each of said portions of said air conveyor being capable of relative movement with respect to the other portions of said air conveyor;

a fixed support; and actuating means connected with said fixed support and at least one of said portions of said air conveyor for causing said relative movement between said portions of said air conveyor, said relative movement between said portions of said air conveyor causing flexing of said guide means to provide curvature along said guide means and thereby establish a height adjustment between said input and output portions of said guide means that continues to allow the articles to be conveyed along said path between said input and output portions of said guide means due to said urging of said articles along said path by the air from said air conveyor.

2. The system of claim 1 wherein said system further includes coupling means for connecting at least one of said input and output portions of said air conveyor with said middle portion of said air conveyor.

3. The system of claim 1 wherein the articles to be conveyed have neck rings, and wherein said guide means include spaced guides at opposite sides of the articles, said spaced guides being engagable with the neck rings of the articles for supporting the articles during conveying of the articles along said path between said input and output portions of said guide means.

4. The system of claim 1 wherein said guide means is flexible over a predetermined operating range that continues to allow the articles to be conveyed along said path between said input and output portions of said guide means, and wherein said actuating means can cause said flexing of said guide means over said predetermined range to thereby enable infinite height adjustments to be made between said input and output portions of said guide means due to said flexing of said guide means by said actuating means within said predetermined range.

5. The system of claim 1 wherein said actuating means includes mechanical means connected between said fixed support and said air conveyor for causing said relative movement between said portions of said air conveyor.

6. The system of claim 5 wherein said mechanical means includes at least one of a crank and a lever.

7. A height adjustable conveyor system for conveying articles having a neck ring, said system comprising:

guide means having first, second, and third portions with each of said portions including flexible guides spaced from one another for supporting the articles at the neck rings of the articles, said guide means establishing a path along which the articles are conveyed through said portions of said guide means;

an air conveyor having adjacent first, second, and third portions each having an end wall spaced from an opposing said end wall of the air conveyor portion adjacent thereto, said air conveyor being adjacent to said guide means and having apertures therein through which air from said air conveyor urges the articles along said path established by said guide means, and said air conveyor having said first, second, and third portions connected with and supporting different ones of said first, second, and third portions of said guide means with each of said portions of said air conveyor being capable of relative movement with respect to the other portions of said air conveyor;

a fixed support; and actuating means connected with said fixed support and said air conveyor to cause said relative movement of said portions of said air conveyor for vertically moving said first portion of said air conveyor with respect to said third portion of said air conveyor and for tilting said second portion of said air conveyor with respect to said first and third portions of said air conveyor, said relative movement of said portions of said air conveyor causing flexing of said spaced guides to provide curvature along said guide means and thereby establish a height adjustment of said first portion of said guide means relative to said third portion of said guide means that continues to allow the articles to be conveyed along said path between said first and third portions of said guide means due to said urging of said articles along said path by the air from said air conveyor.

8. The system of claim 7 wherein said flexible guides of said guide means can be flexed over a predetermined operating range by said actuating means that continues to allow the articles to be conveyed along said path between said first and third portions of said guide means, and wherein said height adjustment of said first portion of said guide means relative to said third portion of said guide means established by said actuating means is infinite within said predetermined range.

9. The system of claim 7 wherein said guide means is positioned below said air conveyor so that said flexible guides of said guide means establishes said path below said portions of said air conveyor, the curvature of said flexible guides being substantially uniform between said adjacent portions of said air conveyor.

10. The system of claim 7 wherein said system further includes coupling means connecting said first and third portions of said air conveyor with said second portion of said air conveyor, said coupling means including means for allowing, during said relative movement, limited second relative movement between said adjacent portions of said air conveyor toward and away from one another.

11. The system of claim 7 wherein said first and third portions of said guide means are output and input portions, respectively, of said guide means, and wherein said output portion of said guide means is connected with said actuating means to cause height adjustment of said output portion of said guide means relative to said input portion of said guide means.

12. A height adjustable conveyor system for conveying articles having a neck ring, said system comprising:

guide means having first, second, and third portions with each of said portions including flexible guides spaced from one another for supporting the articles at the neck rings of the articles and establishing a path along which the articles are conveyed through said portions of said guide means;

an air conveyor having first, second, and third portions spaced from one another with said air conveyor being adjacent to said guide means for urging the articles along said path established by said guide means and having said first, second, and third portions connected with and supporting different ones of said first, second, and third portions of said guide means;

coupling means including pivot means connecting said first and third portions of said air conveyor with said second portion of said air conveyor to allow relative movement between said portions of said air conveyor;

a fixed support; and actuating means including a substantially L-shaped lever pivotably connected with said fixed support and at least one of said portions of said air conveyor to cause said relative movement of said portions of said air conveyor for vertically moving said first portion of said air conveyor with respect to said third portion of said air conveyor and for tilting said second portion of said air conveyor with respect to said first and third portions of said air conveyor with said movement of said portions of said air conveyor causing flexing of said spaced guides to thereby establish height adjustment of said first portion of said guide means relative to said third portion of said guide means.

13. The system of claim 12 wherein said actuating means also includes a crank connected with said substantially L-shaped lever.

14. The system of claim 12 wherein said substantially L-shaped lever has first and second arms, and wherein said system also includes a bar extending substantially parallel to one of said arms of said substantially L-shaped lever with said bar being connected at opposite ends with said first portion of said air conveyor and with said fixed support.

* * * * *